FIG.—1

Aug. 14, 1956  L. H. ERICKSON  2,758,487
DRIVING AND BRAKING MECHANISM FOR ROTATABLE MEMBERS
Filed Aug. 29, 1952  3 Sheets-Sheet 2

INVENTOR.
Lowell H. Erickson
BY
ATTORNEYS

Aug. 14, 1956 L. H. ERICKSON 2,758,487
DRIVING AND BRAKING MECHANISM FOR ROTATABLE MEMBERS
Filed Aug. 29, 1952 3 Sheets-Sheet 3

INVENTOR.
Lowell H. Erickson

BY
*Lampolue and Van Valkenburgh*

ATTORNEYS

_United States Patent Office_

2,758,487
Patented Aug. 14, 1956

2,758,487

DRIVING AND BRAKING MECHANISM FOR ROTATABLE MEMBERS

Lowell H. Erickson, Denver, Colo., assignor to Marcellus S. Merrill, Denver, Colo.

Application August 29, 1952, Serial No. 307,060

15 Claims. (Cl. 74—472)

This invention relates to means for rotating and stopping rotatable members. A specific use relates to rotatable members which are to be driven by a moving belt brought in contact with an annular surface thereof.

One of the broad objects of the invention is to produce improved means for rotating and stopping a rotatable member.

A further and more specific object is to provide means for starting and stopping a pulley of a moving belt mounted to be frictionally engaged with and disengaged from a rotatable body.

Another object is to produce a belt driving mechanism for a rotatable member and control means therefor involving a single controllable member which will permit the belt to be caused to be driven to thereby rotate the rotatable body or held against any movement so that the belt can be employed to brake and stop rotation of the rotatable body.

Still another object is to produce driving and stopping means for a belt mounted for movement on a pivoted arm which will permit an operator to grasp and operate a single member to swing the arm, drive the belt or stop and hold the belt from movement.

A more specific object is to produce improved means controllable by a single member for spinning and braking bodies which are to be observed on a machine to determine their unbalance.

Other objects of the invention will become apparent from the following description taken in connection with the accompanying drawings in which.

Figure 1:
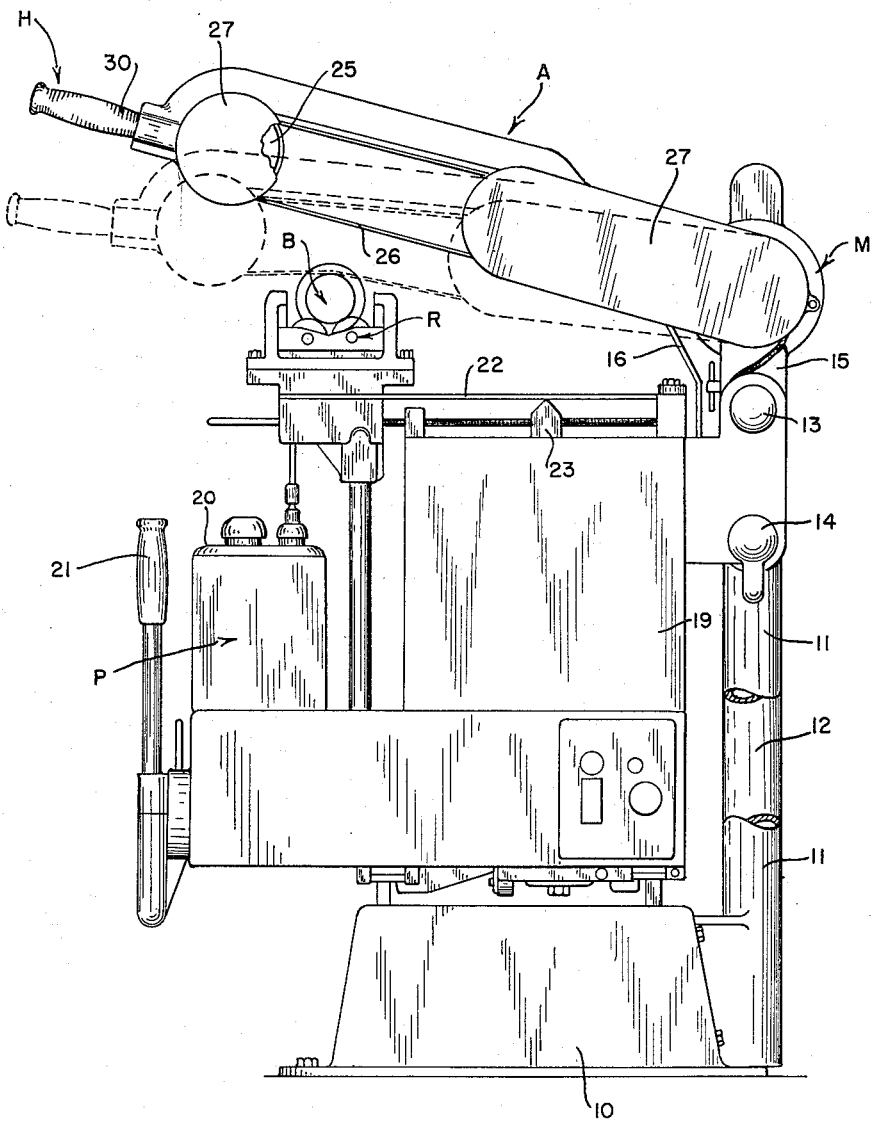
Figure 1 is an end view of a balancing machine showing, by way of example, driving and stopping means embodying my invention and employed in connection with the rotatable body to be balanced.
Figure 2:
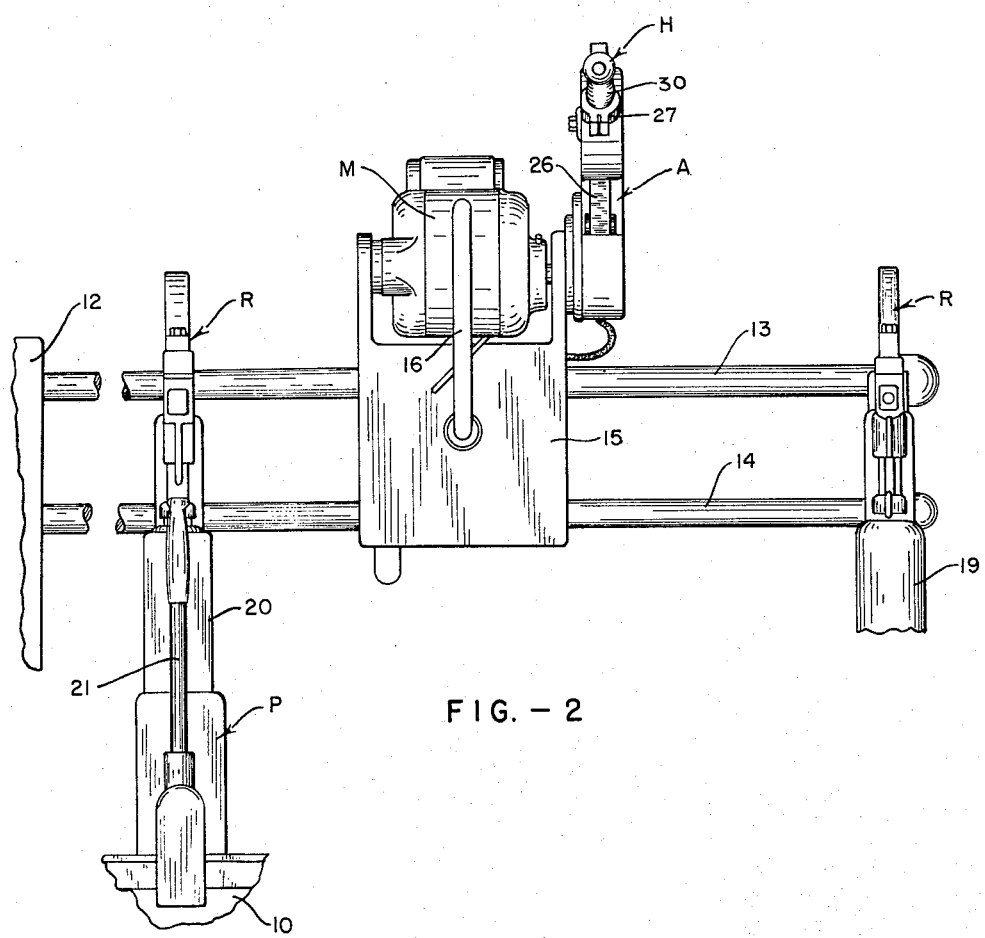
Figure 2 is a front view of the upper part of the balancing machine.

Referring to the drawings in detail and first to Figures 1 and 2, there is illustrated a balancing machine for determining the unbalance of rotating bodies so that such can be corrected in a well known manner, as by adding or removing weight at certain determined points. This machine has associated therewith means including a belt for rotating and stopping the body to be balanced and it is in this structure that my invention has been embodied.

It is to be understood, however, that the structure in which the invention is embodied is shown by way of example only, it being obvious that such can be used for rotating and stopping any rotatable member whether it is driven by a belt or not.

In the balancing machine shown there is a base structure 10 at the rear of which are two upstanding posts 11 and 12. Extending between these posts are two parallel rails 13 and 14 on which is mounted an electric motor carrying support 15 capable of sliding movement by operation of suitable mechanism including the handle 16. The electric motor M is mounted on this support and one end of its rotor shaft 17 is arranged to drive a pulley 18 (see Figure 3). It is with this motor and pulley that the body to be balanced is rotated, as will become apparent.

On the base are also upstanding support structures 19 and 20 which will have mounted thereon a suitable vibratory cradle. The support structure 19 is fixed to the base and the support structure 20 is arranged to be movable toward and away from the support structure 19 to thus vary the width of the cradle to receive different sizes and kinds of rotating bodies to be balanced. The movement of support structure 20 is accomplished by a handle 21.

Associated with each support structure 19 and 20 is a vibratory element 22 in the form of a leaf spring which rests on a movable fulcrum 23 and carries at its outer end a bearing structure R. The two bearing structures and springs form a vibratory cradle on which the body B to be balanced is mounted. There is also provided with each bearing structure of the cradle electrical pickups P. These pickups are part of an electronic hookup whereby the vibrations transmitted to the cradle, caused by the unbalance of the body rotating thereon, can be observed and the amount and position of the unbalance observed, determined and corrected in a known manner which need not be described as such is not pertinent to the invention here involved, which relates to driving and stopping means for the rotating body B.

Figure 4:
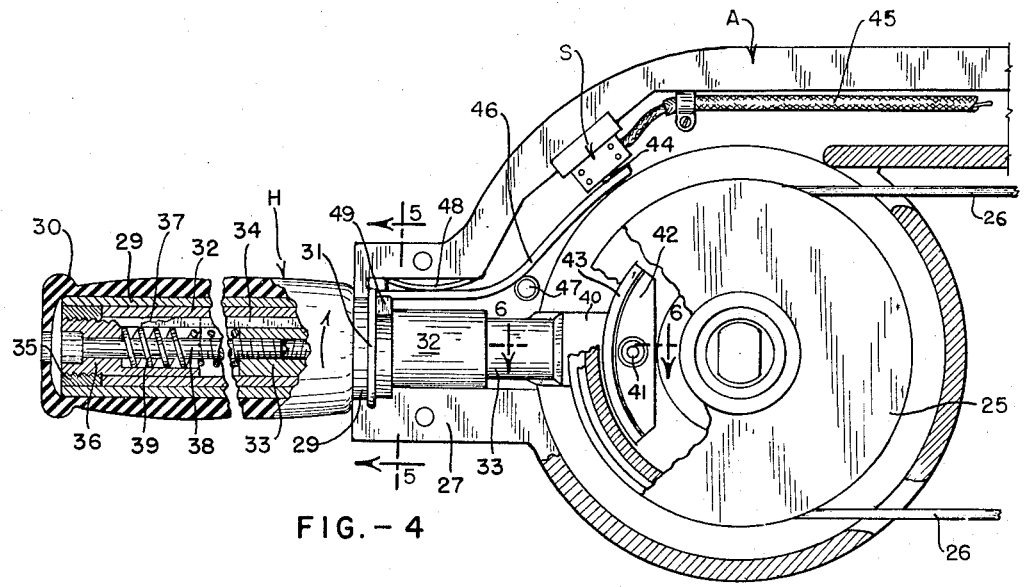
Figure 4 is a view, partly in section, showing the control handle and associated structure whereby a single hand of an operator can be employed to swing the belt carrying arm, control a switch for the motor and apply and disengage a brake for a pulley of the belt at the free end of the arm.
Figure 3:
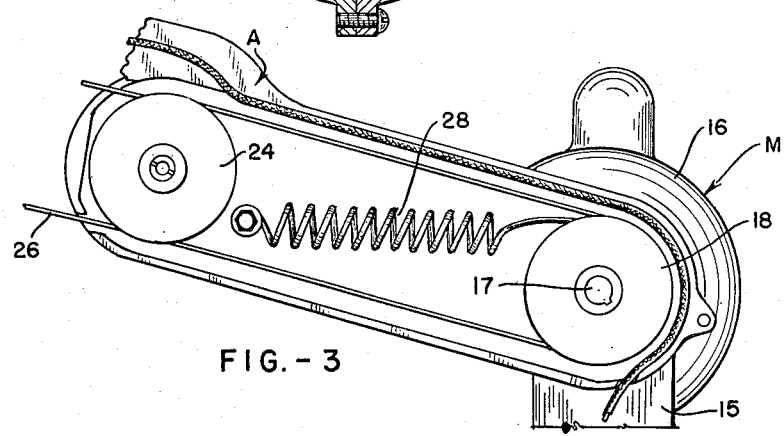
Figure 3 is a view showing the manner of pivoting the belt carrying arm to the balancing machine and the manner of driving the belt by the electric motor.

Associated with the motor shaft, in addition to the drive pulley 18 already referred to, is an arm A which is pivotally mounted thereon at one of its ends and extends forwardly over the top of the cradle and the body B to be balanced. As best shown in Figures 3 and 4, this arm carries centrally thereof an idler pulley 24 and near its outer end a second idler pulley 25. An endless belt 26 extends around the driving pulley 18, over the central pulley 24 and around the end idler pulley 25. The lower run of the belt between pulleys 25 and 24 is directly above the body B and thus when the belt is being driven, the arm A can be lowered to bring this run of the belt into frictional engagement with a part of the body and cause rotation thereof. The central idler pulley 24 will prevent excessive flexing of the belt as pressure is applied between the belt and body. The arm is so constructed that the run of the belt which is to engage the body is properly exposed. A cover 27 will protect the pulleys and have such shape as to allow exposure of the said run. The portion of this cover that protects pulley 25 fits over an integral part of the arm on which pulley 25 is journaled. The arm A will be yieldably held so the belt will normally be positioned above the body B. This is accomplished by a strong coil spring 28 (Figure 3) having one end attached to the arm and its other end suitably attached around the motor shaft. The direction of pull of the spring is such as to raise the arm a suitable distance above the body as shown in Figure 1.

I desire to start and stop the motor, move the arm to body driving position and to brake or hold the belt from moving, all in a simple and convenient manner, particularly one whereby all the desired operations can be accomplished by a single hand of the operator moving a single control member such as a handle. The reason for braking the belt is to hold it from movement and permit it to be employed to frictionally engage and quickly stop rotation of the rotating body B after it has been brought up to a desired speed of rotation and observations made through the use of the pickups and instruments in the electronic hookup.

Figure 6:
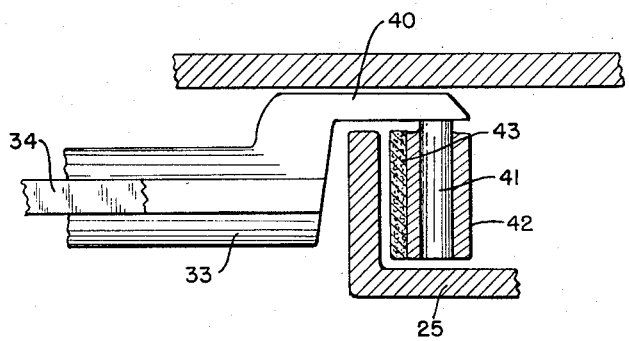
Figure 6 is a sectional view taken on the line 6—6 of Figure 4 showing details of the brake for the pulley.
Figure 5:
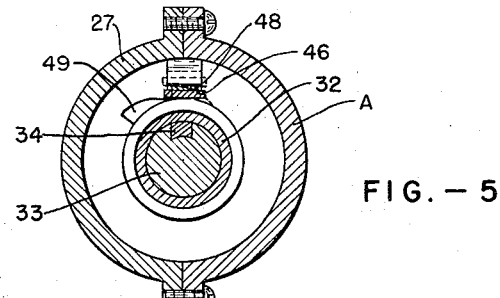
Figure 5 is a sectional view taken on the line 5—5 of Figure 4 showing the cam operation for the switch lever.

The structure shown to accomplish my desired operations is best shown in Figures 4, 5 and 6. On the forward end of the arm A there is mounted a rotatable handle H. The rotatable part of this handle comprises a tubular member 29 carrying on its outer surface a grip structure 30 of rubber or like material. The forward end of the tubular member is rotatable in a bearing opening formed between the arm structure and the forward part of the cover 27 and held thereby by a snap ring 31. Within the tubular member 29 is a sleeve 32 upon which the tubular member rotates and within this sleeve is a brake actuator rod 33. The sleeve is held against rotation by a clamping action between the end of the arm and the forward part of cover 27. The sleeve is slidably connected with the rod by a key 34. In the outer end of the tubular member 29 is brazed or otherwise secured a nut 35. Threaded into the nut is a plug 36 having a slot 37 into which the rear end of key 34 extends so the plug will be locked with the sleeve and brake actuator rod. An adjusting screw 38 is rotatably mounted in the plug and extends so as to be threaded into the outer end of the actuator rod which is in spaced relation to the plug, all as shown in Figure 4. A coil spring 39 surrounding the screw acts between the plug and rod so the plug can move the rod to release the brake. With this construction it is seen that upon rotation of the handle the brake actuator rod can be slidably moved longitudinally in opposite directions, depending on the direction of rotation of the handle.

The inner end of the brake actuating rod has an offset extension 40 which is shown in Figure 6 and on the extreme end of this offset extension, which is inward of the rim of the pulley 25, is a pin 41 which extends laterally to be inside of the pulley rim. On this pin is a brake shoe 42 having a brake lining 43 for engaging the inner surface of the pulley rim. With this construction it will be seen that if the handle is turned in such a direction as to move the brake actuating rod outwardly, the brake shoe 42 will be applied against the inner surface of the pulley rim and the pulley held against any rotation. With the pulley being held, the belt will also be held. By turning the handle in the opposite direction, the brake shoe will be released.

The rotatable tubular member 29 of the handle is employed to control the starting and stopping of the motor. As shown in Figure 4, there is mounted on the front end of the arm A within the recess where the pulley 25 is journaled a switch S. This switch is of known construction having a control plunger 44. This plunger is spring actuated and when released or in normal condition permits the switch to be closed. Suitable conductors in the cable 45 connect the switch in the motor circuit, said cable 45 extending along the arm in the manner shown. To control the plunger 44 of the switch there is provided an angular lever 46, one end of which is positioned adjacent the outer end of the plunger 44 and the other end of this extends to a position to ride on the outer end of the tubular member 29 which is turned by the handle. Cooperating with the central part of the lever 46 is a fulcrum pin 47. In order to maintain the switch actuating end of the lever in a position to cause the switch to be open, there is interposed between the forward end of the lever 46 and the arm structure a bowed leaf spring 48 which will act on the lever and cause it to swing about the fulcrum pin and press the plunger 44 inwardly. To allow the plunger 44 to move outwardly under the action of the spring and thereby close the switch, it is necessary to move the forward end of the lever 46 upwardly against the bias of the bowed spring 48. This is accomplished by the employment of a cam 49 secured to the inner end of the tubular member 29 just beyond the snap ring. This cam is best shown in Figure 5.

The cam on the sleeve will be so placed that when the tubular member 29 is turned in a clockwise direction from the full line position shown in Figure 5 to the dotted line position, the cam will move under the end of lever 46 and raise it upwardly, thereby allowing closing of the switch. At the beginning of this movement of the cam to move the lever, the brake shoe will be disengaged and will continue to remain disengaged as the lever 46 is actuated to permit closing of the switch as this direction of rotation of the handle results only in the brake rod moving to the right as viewed in Figure 4. The brake will only be applied when the tubular member 29 and the handle are rotated in a counterclockwise direction from the position shown in Figure 5 wherein the cam 49 is not beneath the lever 46. To assure this position of the cam and operation of the switch and brake, the already mentioned adjustable screw is employed so there can be made a proper adjustment of the brake shoe with respect to the inner surface of the rim of the pulley which is to be engaged thereby.

The operation of my improved driving and stopping mechanism for a rotatable member is believed to be obvious from the detailed description of the structure involved, but in order that this operation be clear, it is briefly described as follows:

When the handle is in the position shown in Figures 4 and 5, the switch S will be open and the brake will be released. If it is desired to start the electric motor and drive the belt, such will be accomplished by grasping the handle with one hand and turning it in a direction shown by the arrows in Figures 4 and 5. The result will be that the brake will remain disengaged and the lever 46 will be so actuated by the cam 49 that the switch S will become closed, thus closing the circuit to the motor M, thereby starting the motor and causing the belt 26 to be driven. The arm A can then be swung downwardly to bring the exposed run of the belt into frictional engagement with the body B to be balanced, thus causing it to be spun at a high rate of speed. When the desired rate of speed is reached, the arm can be lifted to disengage the belt and then the unbalance of the body observed and the amount and position of the unbalance determined. After the spinning is accomplished, the motor can be shut off by turning the handle back to the position in Figures 4 and 5 to thereby open the switch.

After determining the unbalance conditions of the rotating body, it is of course desirable to stop this body so weights can be added or so the body can be removed from the cradle. To stop the body from rotating, the handle will be turned from the position shown in Figures 4 and 5 in a direction opposite the arrows and the result will be that the switch will remain open and the brake actuating rod moved outwardly or to the left as viewed in Figure 4. This is accomplished due to the turning of the nut 35 on the threaded plug 36, thus moving the plug and adjusting screw outwardly and carrying therewith the brake rod. As the brake rod moves outwardly it will hold the brake shoe in engagement with the surface of the rim of the pulley 25 and thus bring it to a quick stop. With this pulley held from moving, the belt will also be held from movement and with this condition present the arm can be lowered to bring the exposed run of the belt into frictional engagement with the rotating body and thus brake it down to a stop.

It will be noted that starting and stopping of the belt and the holding of the belt against any movement, together with raising and lowering of the arm, is all accomplished by using one hand only of an operator on the single handle at the outer end of the arm and then either swinging the arm or turning the handle in certain directions. This permits rapid and efficient control of the body to be balanced and it can be brought up to any desired speed quickly and can be stopped quickly. The arm can be swung away from the cradle so a body can be easily removed from or positioned on the cradle.

Being aware of the possibility of modifications in the particular structure disclosed by way of example and also its use to start and stop rotatable members, all without departing from the fundamental principles of my invention, I do not intend that the scope of my invention be limited in any manner except in accordance with the appended claims.

What is claimed is:

1. In driving and stopping mechanism, a rotatable member, a brake therefor, means for driving the rotatable member including a starting and stopping control element, a movable handle, means operable by a movement of the handle from one position to a second position for applying the brake and for releasing the brake upon a return movement, means operable by movement of the handle from said one position to a third position and return for moving the said control element so as to start and stop the driving means, and means carried by the handle for adjusting the "off" position of the brake when the handle is in the said one position.

2. In driving and stopping mechanism, a rotatable member, a brake therefor, means for driving the rotatable member including a starting and stopping control element, a rotatable handle, means including a member reciprocable axially of the axis of rotation of the handle and operable by a rotation of the handle from one position to a second position for applying the brake and for releasing the brake upon a return movement, and means operable by a rotation of the handle from said one position to a third position and return for moving the said control element so as to start and stop the driving means.

3. In driving and stopping mechanism, a rotatable member, a support therefor, means for driving the rotatable member including a control element therefor, a rotatable handle on the support, a rod mounted in the handle for sliding movement axially of the handle axis, a brake element carried by the rod for engaging the rotatable member, means for conditioning the control element to cause the rotatable member to be driven by a rotation of the handle in one direction from one position to a second position or to be stopped by a return to the one position, and means for moving the rod to apply the brake by a rotation of the handle in the opposite direction from said one position to a third position and to release the brake upon a return movement.

4. In driving and stopping mechanism, a rotatable member, a support therefor, means for driving the rotatable member including a control element therefor, a rotatable handle on the support, a rod mounted in the handle for sliding movement axially of the handle axis, a brake element carried by the rod for engaging the rotatable member, means for conditioning the control element to cause the rotatable member to be driven by a rotation of the handle in one direction from one position to a second position or to be stopped by a return to the one position, means for moving the rod to apply the brake by a rotation of the handle in the opposite direction from said one position to a third position and to release the brake upon a return movement, and means carried by the handle for adjusting the "off" position of the brake when the handle is in the said one position.

5. In starting and stopping mechanism, a support, a rotatable member on the support, a rotatable handle on the support mounted to rotate about an axis at right angles to the rotatable member, an electric motor for driving the rotatable member, a motor circuit including a switch positioned adjacent the rotatable member, means operable by a rotation of the handle in one direction from one position to a second and return for closing and opening the switch, a brake for the rotatable member, and means including a reciprocable member movable axially of the handle axis and operable by a rotation of the handle from said one position in the opposite direction to and return for applying and releasing the brake.

6. In driving and stopping mechanism, a rotatable member, a support therefor, an electric motor for driving the rotatable member including a control switch therefor, a rotatable handle on the support, a rod mounted in the handle for sliding movement along the axis of rotation of the handle, a brake element carried by the rod for engaging the rotatable member, means including a cam rotatable with the handle and a lever controlled thereby for operating the switch to cause the rotatable member to be driven by a rotation of the handle in one direction from one position to a second position or to be stopped by a return to the one position, and means for moving the rod axially to apply the brake by a rotation of the handle from said one position to a third position and to release the brake upon a return movement.

7. In starting and stopping mechanism, a support, a rotatable pulley on the support, a rotatable handle on the support mounted to rotate about an axis at right angles to the pulley, an electric motor and belt for driving the pulley, a motor circuit including a switch positioned adjacent the pulley, means operable by a rotation of the handle in one direction from one position to a second and return for closing and opening the switch, a brake for engaging the inside rim of the pulley, and means including a slidable rod connected with the brake and carried in the handle and connected therewith so as to be operable by a rotation of the handle from said one position in the opposite direction to and return for applying and releasing the brake.

8. In starting and stopping mechanism, a support, a rotatable member on the support, a rotatable handle on the support mounted to rotate about an axis at right angles to the rotatable member, means for driving the member including a control element, means operable by a rotation of the handle in one direction from one position to a second and return for closing and opening the switch, a brake for the rotatable member, and means operable by a rotation of the handle from said one position in the opposite direction to and return for applying and releasing the brake, said last named means including a slidable rod in the handle, and a connection between the handle and rod including cooperating threaded members.

9. In apparatus for rotating and stopping a rotatable member, a pivoted arm, a pulley carried by the free end of the arm, an endless belt running over the pulley and arranged by swinging the arm to move with the arm and be frictionally engaged and disengaged from the member to be rotated, means for driving the belt including a second pulley and an electric motor drivingly connected thereto, a handle carried by the free end of the arm, a brake carried by the arm for the first named pulley, a switch carried by the arm for controlling the electric motor, and means operable by movement of the handle for selectively controlling the switch and the brake.

10. In apparatus for rotating and stopping a rotatable member, a pivoted arm, a pulley carried by the free end of the arm, an endless belt running over the pulley and arranged by swinging the arm to be frictionally engaged and disengaged from the member to be rotated, means for driving the belt including a second pulley and an electric motor drivingly connected thereto, a rotatable handle carried by the free end of the arm and having its axis extending in the longitudinal direction of the arm and at right angles to the axis of rotation of the first pulley, a brake carried by the arm for the first named pulley, a switch carried by the arm for controlling the electric motor, and means operable by rotation of the handle in opposite direction from a predetermined position for selectively controlling the switch and the brake.

11. In apparatus for rotating and stopping a rotatable member, a pivoted arm, a pulley mounted at the free end of the arm, a second pulley mounted intermediate the ends of the arm, a third pulley mounted at the pivotal axis of the arm, an endless belt trained over the three pulleys and arranged by swinging the arm to be frictionally engaged with and disengaged from a member to be rotated by its run between the first and second pulleys, means for driving the third pulley including a control element therefor, a handle carried by the free end of the arm, a brake carried by the arm for engagement with the first named pulley, and means operable by movement of the handle for selectively controlling the control element and the brake.

12. In apparatus for rotating and stopping a rotatable member, a pivoted arm, a pulley mounted at the free end of the arm, a second pulley mounted intermediate the ends of the arm, a third pulley mounted at the pivotal axis of the arm, an endless belt trained over the three pulleys and arranged by swinging the arm to be frictionally engaged with and disengaged from a member to be rotated by its run between the first and second pulleys, means for driving the third pulley including a control element therefor, a rotatable handle carried by the free end of the arm and extending outwardly from the free end thereof in the longitudinal direction of the arm, a brake carried by the arm for the first named pulley, and means operable by rotation of the handle in opposite directions from a predetermined position for selectively controlling the control element and the brake.

13. In apparatus for rotating and stopping a rotatable member, a pivoted arm, a pulley mounted at the free end of the arm, another pulley mounted at the pivotal axis of the arm, an endless belt trained over the pulleys and arranged by swinging the arm to be frictionally engaged with and disengaged from a member to be rotated by its run between the first and second pulleys, an electric motor for driving the last named pulley including a switch for its circuit, a rotatable handle carried by the free end of the arm, a brake carried by the arm for the first named pulley, means operable by rotation of the handle in opposite directions from a predetermined position for selectively controlling the switch and the brake, and means carried by the handle for adjusting the "off" position of the brake.

14. In apparatus for rotating and stopping a rotatable member, a pivoted arm, a pulley carried by the arm, an endless belt running over the pulley and arranged by swinging the arm to move with the arm and be frictionally engaged and disengaged from the member to be rotated, means including an electric motor for driving the belt, an operating handle carried by the arm, a brake for the pulley also carried by the arm, a switch carried by the arm for controlling the electric motor, and means operable by movement of the handle for selectively controlling the switch and the brake.

15. In driving and stopping mechanism, a support arm, a rotatable member carried by the arm, means including a source of power for driving the rotatable member, a starting and stopping control element for the source of power carried by the arm, a rotatable handle on the arm, a brake for the rotatable member carried by the arm, means operable by a movement of the handle from one position to a second position for applying the brake and for releasing the brake upon a return movement, and means operable by movement of the handle from said one position to a third position and return for moving the said control element so as to start and stop the source of power of the driving means.

References Cited in the file of this patent

UNITED STATES PATENTS

| | | |
|---|---|---|
| 610,064 | Kottgen | Aug. 30, 1898 |
| 1,362,700 | Huffman | Dec. 21, 1920 |
| 1,552,135 | Frink | Sept. 1, 1925 |
| 1,595,287 | Buss | Aug. 10, 1926 |
| 1,727,933 | Mitchell | Sept. 10, 1929 |
| 2,202,551 | Guffey | May 28, 1940 |
| 2,321,098 | Morse | June 8, 1943 |
| 2,392,097 | Meunier | Jan. 1, 1946 |